(12) United States Patent
Krapf et al.

(10) Patent No.: US 8,698,482 B2
(45) Date of Patent: Apr. 15, 2014

(54) UWB MEASURING DEVICE CAPABLE OF REDUCING DISTURBANCE IN EXTERNAL SIGNALS

(75) Inventors: Reiner Krapf, Reutlingen (DE); Heiko Braun, Leinfelden-Echterdingen (DE); Michael Mahler, Leinfelden-Echterdingen (DE); Christoph Wieland, Stuttgart-Vaihingen (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 12/680,669

(22) PCT Filed: Jul. 28, 2008

(86) PCT No.: PCT/EP2008/059870
§ 371 (c)(1),
(2), (4) Date: Jul. 22, 2010

(87) PCT Pub. No.: WO2009/043618
PCT Pub. Date: Apr. 9, 2009

(65) Prior Publication Data
US 2010/0295531 A1 Nov. 25, 2010

(30) Foreign Application Priority Data
Sep. 28, 2007 (DE) .......................... 10 2007 046 645

(51) Int. Cl.
*G01R 23/00* (2006.01)
*G01R 29/00* (2006.01)

(52) U.S. Cl.
USPC ......... 324/76.11; 324/76.19; 342/36; 342/89; 342/198

(58) Field of Classification Search
USPC ............ 324/76.11, 637–646; 342/20, 36, 40, 342/198
See application file for complete search history.

(56) References Cited

U.S. PATENT DOCUMENTS

| | | | | |
|---|---|---|---|---|
| 6,411,250 B1 * | 6/2002 | Oswald et al. | .................. | 342/70 |
| 6,834,073 B1 * | 12/2004 | Miller et al. | .................. | 375/130 |
| 6,888,491 B2 * | 5/2005 | Richter | .......................... | 342/70 |
| 7,633,435 B2 * | 12/2009 | Meharry et al. | .............. | 342/198 |
| 7,724,175 B2 * | 5/2010 | Mahler et al. | .................. | 342/22 |
| 7,750,838 B2 * | 7/2010 | Krapf et al. | ..................... | 342/22 |
| 7,764,222 B2 * | 7/2010 | Tyree et al. | ..................... | 342/89 |
| 2004/0077306 A1 * | 4/2004 | Shor et al. | ......................... | 455/1 |
| 2005/0213635 A1 * | 9/2005 | Terada et al. | ................. | 375/130 |
| 2006/0012511 A1 * | 1/2006 | Dooi et al. | ....................... | 342/70 |
| 2006/0078038 A1 * | 4/2006 | McCorkle | ..................... | 375/130 |
| 2007/0076813 A1 * | 4/2007 | Haartsen | ....................... | 375/285 |

(Continued)

FOREIGN PATENT DOCUMENTS

| | | |
|---|---|---|
| DE | 10 2005 052 369 | 5/2007 |
| WO | WO 02/086536 | 10/2002 |
| WO | WO 2005/116683 | 12/2005 |

*Primary Examiner* — Huy Q Phan
*Assistant Examiner* — Adam Clarke
(74) *Attorney, Agent, or Firm* — Merchant & Gould P.C.

(57) ABSTRACT

The invention relates to a measuring device, especially for a machine tool and/or a manual measuring device, comprising a measuring unit (12*a-d*) that is adapted to measure and an external signal recognition unit (14*a-d*). The invention is characterized in that the external signal recognition unit (14*a-d*) is adapted to recognize an external signal during and/or prior to a measurement of the measuring unit (12*a-d*).

19 Claims, 3 Drawing Sheets

(56) References Cited

U.S. PATENT DOCUMENTS

| | | | |
|---|---|---|---|
| 2007/0194978 A1* | 8/2007 | Teshirogi et al. | 342/28 |
| 2008/0198067 A1 | 8/2008 | Krapf et al. | |
| 2008/0223535 A1* | 9/2008 | Eichhorn et al. | 162/123 |
| 2010/0183063 A1* | 7/2010 | Fukagawa et al. | 375/224 |
| 2012/0182175 A1* | 7/2012 | Krapf et al. | 342/118 |

* cited by examiner

UWB MEASURING DEVICE CAPABLE OF REDUCING DISTURBANCE IN EXTERNAL SIGNALS

This application is a National Stage Application of PCT/EP2008/059870, filed 28 Jul. 2008, which claims benefit of Serial No. 10 2007 046 645.7, filed 28 Sep. 2007 in Germany and which applications are incorporated herein by reference. To the extent appropriate, a claim of priority is made to each of the above disclosed applications.

TECHNICAL FIELD

A measuring device for a machine tool and/or a manual measuring device is already known. The measuring device has a measuring unit that is adapted to measure and an external signal unit.

SUMMARY

The invention relates to a measuring device, especially for a machine tool and/or a manual measuring device, comprising a measuring unit that is adapted to measure and an external signal recognition unit.

The invention is characterized in that the external signal recognition unit is adapted to recognize an external signal during and/or prior to a measurement of the measuring unit. In this connection, equipped, designed and/or programmed should be understood by the term "adapted". By means of the configuration of the invention, an advantageous protection of an external signal of an active service, as for example an air traffic control, a UMTS transmitter etc., can be protected from a disturbance by the measuring unit and/or components of the measuring unit, especially a sensor element and/or a receiving element, can be at least partially protected from a disturbance, respectively from the external signal and/or an overload. A frequency range of the external signal recognition unit to be monitored advantageously corresponds to a measuring frequency, respectively a measuring spectrum, of the measuring unit. A measuring frequency, respectively a measuring spectrum, can be changed to a frequency range by means of the measuring unit, which is omitted from an external signal frequency, respectively an external signal spectrum, when an external signal is present. The measuring unit preferably has an ultra wideband unit, which is adapted to perform ultra wide band measurements, the ultra wide band unit transmitting and/or detecting an ultra wide band signal. In this case, an electromagnetic signal, which has a useful frequency range with a middle frequency in the frequency range of 1 GHz to 15 GHz and a frequency band width of at least 500 MHz, should particularly be understood by the term "ultra wide band signal (or UWB signal)".

The invention is furthermore characterized in that the external signal unit has at least one pulse signal detection unit, which is adapted to detect an external pulse signal, whereby a targeted search for, respectively detection of, in particular periodic, pulsed external signals, as, for example, signals from an air traffic control, can be achieved and in so doing a higher safety standard for services with pulsed signals can be achieved. In this context, a periodic, pulsed external signal, whose cycle duration can be up to twelve seconds, should be understood by the term "external pulse signal". The external pulse signal is preferably formed from a radar signal. The pulse signal detection unit is preferably is implemented using a diode circuit, such as, for example, a Schottky diode circuit and/or a tunnel-diode circuit.

If the measuring unit furthermore has at least one sensor receiver, which is at least partially integral with the pulse signal detection unit, additional components, installation space, assembly work and costs can be saved. In this connection, particularly one-piece should be understood by the term "integral", i.e. manufactured from one casting or as a single component, in particular configured as an integrated component. A detector element for detecting a measurement signal should thereby be understood by the term "sensor receiver".

The invention is furthermore characterized in that the external signal recognition unit has at least one continuous signal detection unit, which is adapted to detect continuous external signals, whereby a detection of continuous external signals, which is independent of a measuring signal, respectively of external pulse signals, can be achieved. Especially a continually transmitted external signal, as, for example, a UMTS signal, should thereby be understood by the term "continuous external signal". The continuous signal detection unit preferably has a wide band receiver, which ascertains a received power over a preset frequency range.

A particularly space saving arrangement of the measuring unit and at least partially of the external signal recognition unit can advantageously be achieved on a semiconductor chip if the measuring unit has at least one sensor receiver, which at least is configured partially integral with the continuous signal detection unit.

In a further configuration of the invention, said invention is characterized in that the external signal recognition unit has at least one antenna element, which is adapted to receive the external signal, whereby a reception of the external signal independent of the measuring unit can be advantageously achieved and thus an undesirable weakening of a received signal, as for example as a result of a signal splitting, is prevented.

The invention is furthermore characterized in that the pulse signal detection unit and/or the continuous signal detection unit have (has) the antenna element, whereby a sensitivity of the antenna element can advantageously be adapted to an external signal.

Additional components, installation space, assembly work and costs can advantageously be saved if the measuring unit has an antenna unit for receiving and/or transmitting a measurement signal, which has at least partially the antenna element that is adapted to receive the external signal. In so doing, the antenna unit can comprise a montostatic or a bistatic measuring system.

The measuring device advantageously has a signal extraction unit, which is adapted to split a received signal of the antenna unit, whereby an advantageous forwarding of the received signal to various detectors, especially a pulse signal detector and/or a continuous signal detector, and/or sensors of the measuring unit can be achieved. The signal extraction unit is thereby preferably formed from a directional coupler and a signal splitter, such as, for example, a Wilkenson power splitter etc.

If the signal extraction unit furthermore has at least one switching element, a permanent weakening of a measurement signal can thereby be advantageously avoided by a received signal being split for only a short time within a measuring period or being switched to an additional detector. The switching element is preferably adapted to split or redirect a received signal between the measuring unit and the continuous signal detection unit.

The invention is characterized in an advantageous modification thereto in that the measuring device has a signal processing unit, which is adapted to set an operating mode of the measuring unit when an external signal is present, whereby a protection of an active service, for example an air traffic control, and/or the measuring unit can be achieved. The operating mode can thereby be adapted to reduce a power output of at least a part of a measuring spectrum of the measuring unit or can be configured from a cut-out mode. The cut-out mode is preferably adapted to automatically cut-out the measuring unit when an external signal is present.

If provision is additionally made for the operating mode to change at least one measuring frequency of the measuring unit, a measuring operation can thereby be advantageously maintained when an external signal is present.

BRIEF DESCRIPTION OF THE DRAWINGS

Additional advantages result from the following description of the drawing. Embodiments of the invention are depicted in the drawing. The drawing, the description and the claims contain numerous characteristics in combination. The specialist will also advantageously consider the characteristics individually and arrange them in additional meaningful combinations.

The following are shown.

DETAILED DESCRIPTION

Figure 1:
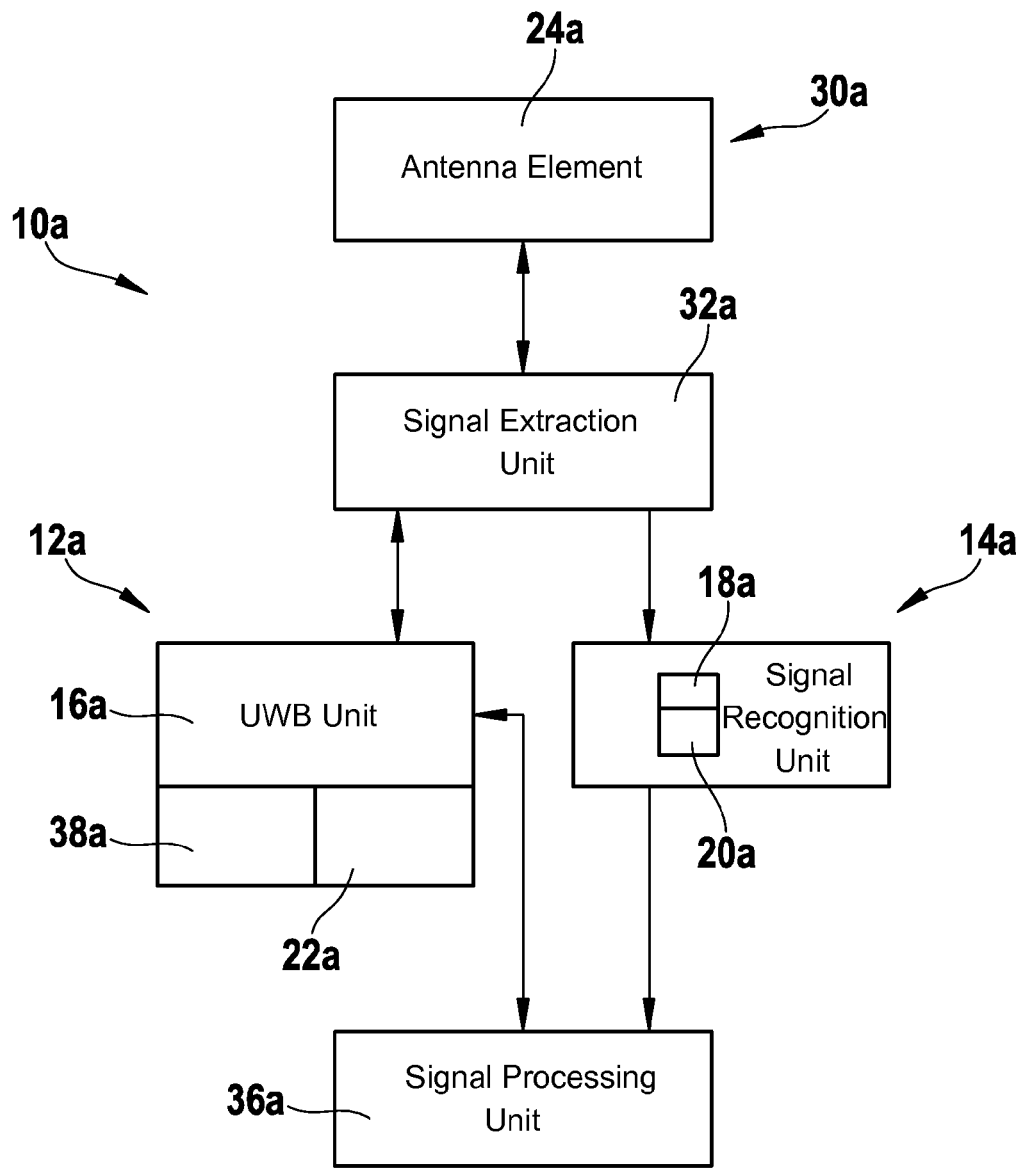
FIG. 1 is a schematic configuration of a measuring device.

A measuring device 10a, which is formed from an ultra wide band measuring device and has a measuring unit 12a and a external signal recognition unit 14a, for a machine tool and/or a manual measuring device is depicted in FIG. 1. The measuring unit 12a has an ultra wide band unit 16a with a sensor receiver 22a, which is formed from an ultra wide band sensor receiver, and an ultra wide band sensor transmitter 38a. In addition, the measuring unit 12a has an antenna unit 30a, which is adapted to receive an ultra wide band radar signal. The antenna unit 30a has an antenna element 24a of the external signal recognition unit 14a, which besides being adapted to transmit and receive an ultra wide band measuring signal of the ultra wide band unit 16a is adapted to receive an external signal of the external signal recognition unit 14a during and/or prior to a measurement of the measuring unit 14a. The receive signal of the antenna element 24a is directed to a signal extraction unit 32a, which is adapted to split the receive signal received by the antenna unit 30a. A first part of the receive signal is directed to the ultra wide band unit 16a of the measuring unit 12a, a second part of the receive signal is directed to the external signal recognition unit 14a.

The external signal recognition unit 14a has a pulse signal detector 18a and a continuous signal detector 20a, which are integrally configured with each other. The continuous signal detector 20a and the pulse signal detector 18a are thereby selective in a frequency range, which is substantially equal to a frequency range of the measuring unit 12a.

Detected, respectively evaluated, data of the external signal recognition unit 14a and the measuring unit 12a are forwarded to a signal processing unit 36a, a transport of data and/or signals occurring within the measuring device 10a by means of an unspecified data bus. Instead of a data bus, it is in principle however also conceivable to allow for a cable-free, respectively wireless, exchange of data and/or signals and/or an exchange by means of a data cable.

During the operation of the measuring device 10a, said device 10a is activated by an operator via an undepicted control element. After that, receive signals, which are directed via the signal extraction unit 32a to the external signal recognition unit 14a, are received by means of the antenna unit 30a. In order to start a first measurement using the measuring unit 12a, a search is initially made for a continuous external signal within the response signal with the aid of the external signal recognition unit 14a, respectively with the aid of the continuous signal recognition unit 20a, within a time window of approximately 500 ms. An evaluation of the data occurs within the continuous signal detection unit 20a, the continuous signal detection unit 20a having its own processor for this purpose and an evaluated parameter being forwarded to the signal processing unit 36a. It is in principle however also conceivable for an evaluation 30a of the data to occur in the signal processing unit 36a and for the continuous signal detection unit 20a to forward the data of the antenna unit 30a merely to the signal processing unit 36a. The evaluated parameter can be transmitted to the signal processing unit 36a in the form of a digital or an analog parameter.

A continuous external signal in the continuous signal detection unit 20a is present if a signal is greater than a defined threshold value. If an external signal is not present in the continuous signal detection unit 20a, respectively the corresponding parameter in the signal processing unit 35a, the measuring unit 12a of the signal processing unit 36a is activated and a first measurement can be started. In so doing, a measuring signal with a measuring spectrum from the ultra wide band sensor transmitter 38a of the ultra wide band unit 16a is directed to the signal extraction unit 32a and from here is directed further to the antenna unit 30a, where said signal is emitted. The measuring signal is reflected off a measuring object and is received by the antenna unit 30a and directed via the signal extraction unit 32a to the sensor receiver 22a and evaluated there.

The signal processing unit 36a activates the pulse signal detection unit 18a simultaneously to the first measurement by the measuring unit 12a, and said pulse signal detection unit 18a begins with a measurement of an external pulse signal. For this purpose, the receive signal, which was directed from the signal extraction unit 32a to the pulse signal detection unit 18a is evaluated by a processor of the pulse signal detection unit 18a. An external pulse signal is present if a signal is greater than a threshold value and this threshold value was consecutively exceeded by a plurality of signals, as, for example, five signals. If the pulse repetition frequency lies at approximately 700 Hz, as for example in the range of the air traffic control, the five signals, respectively pulses, for example, have to be detected within 7.2 ms. If the number of detected pulses is under five, an external pulse signal is not present. The pulse signal detection unit 18a ascertains a parameter from the detected pulses and forwards this to the signal processing unit 36a.

When the external pulse signal and/or the continuous external signal are (is) present, a change in the operating mode of the ultra wide band unit 16a occurs via the signal processing unit 32a. This operating mode is formed from a cut-out mode, which leads to an automatic cut-out of the ultra wide band sensor transmitter 38a of the ultra wide band unit 16a when an external signal is present. As an alternative to this, the operating mode could also lead to a change in the measuring frequency, respectively in the measuring spectrum, of the ultra wide band unit 16a and/or to a reduction in power of the ultra wide band unit 16a so that interferences between the external signal and the measuring signal can be ruled out or at least reduced. The ultra wide band transmitter 38a, respectively the measuring unit 12a, remains switched-off in the cut-out mode initially for a cycle duration of at least 12 seconds. The cycle duration corresponds thereby to a cycle duration of a radar signal of the air traffic control. It is in principle also conceivable for the cycle duration for the external pulse signal detection to be adapted to additional interfering signals, respectively interfering sources. If a renewed measurement of an external pulse signal occurs after a cycle, the ultra wide band unit 16a remains switched-off for at least one additional cycle duration. If no external pulse signal is detected after a cycle, the ultra wide band unit 16a is automatically switched on again, provided a continuous external signal is not present. In so doing, a measuring operation by the measuring unit 12a is restored.

Beside the recognition, respectively detection, of an external pulse signal, the detection of a continuous external signal continues to occur by means of the continuous signal detection unit 20a. A measuring operation of the measuring unit 12a is possible only if neither an external pulse signal nor a continuous external signal is present. If the measuring unit 12a additionally has an optical output unit, as, for example, a display, a current measuring status and/or external signal recognition status can be displayed for the operator of the measuring device 10a. Furthermore, it is also conceivable for special filters to be arranged upstream of the pulse signal detection unit 18a and/or the continuous signal detection unit 20a so that only special external signals can be filtered out, respectively recognized.

Figure 2:
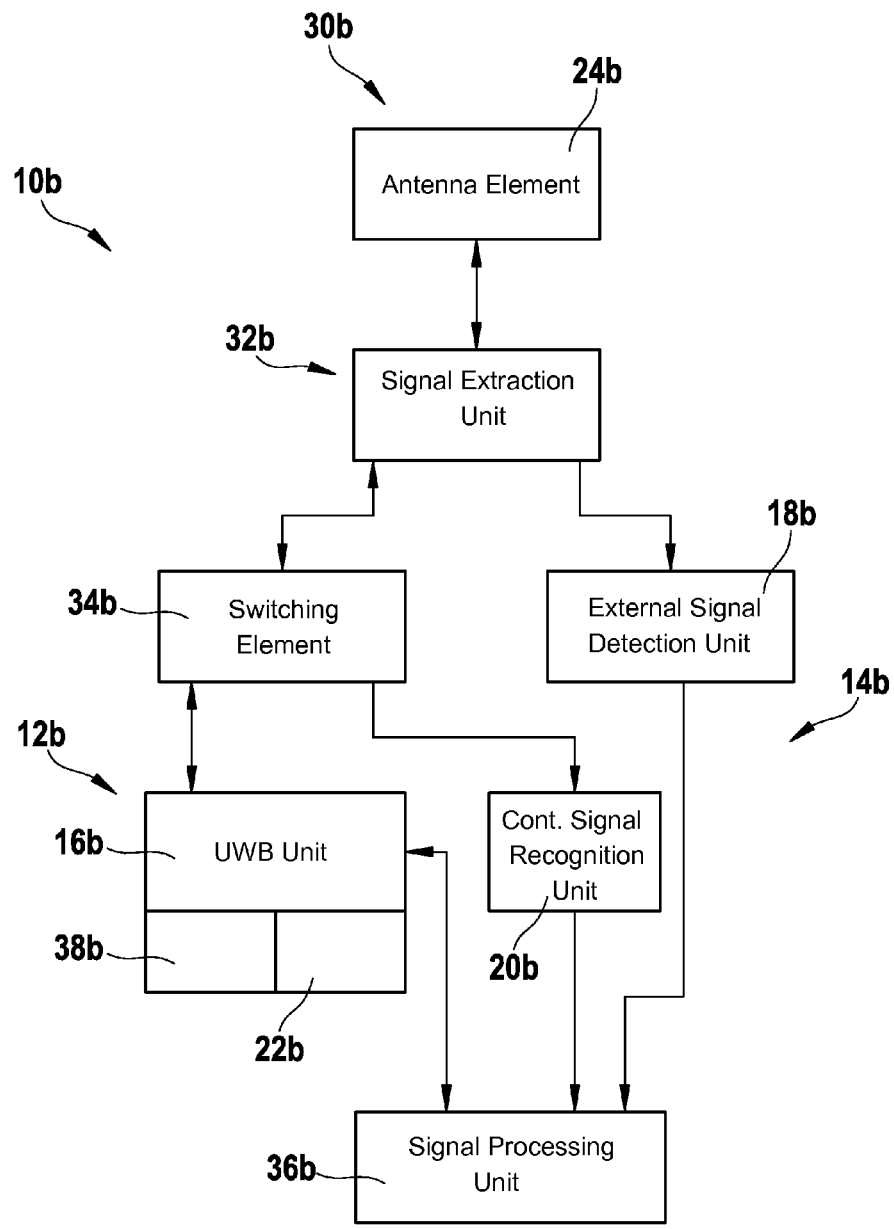
FIG. 2 is an alternative configuration of the measuring device with separate detectors in a schematic depiction.
Figure 3:
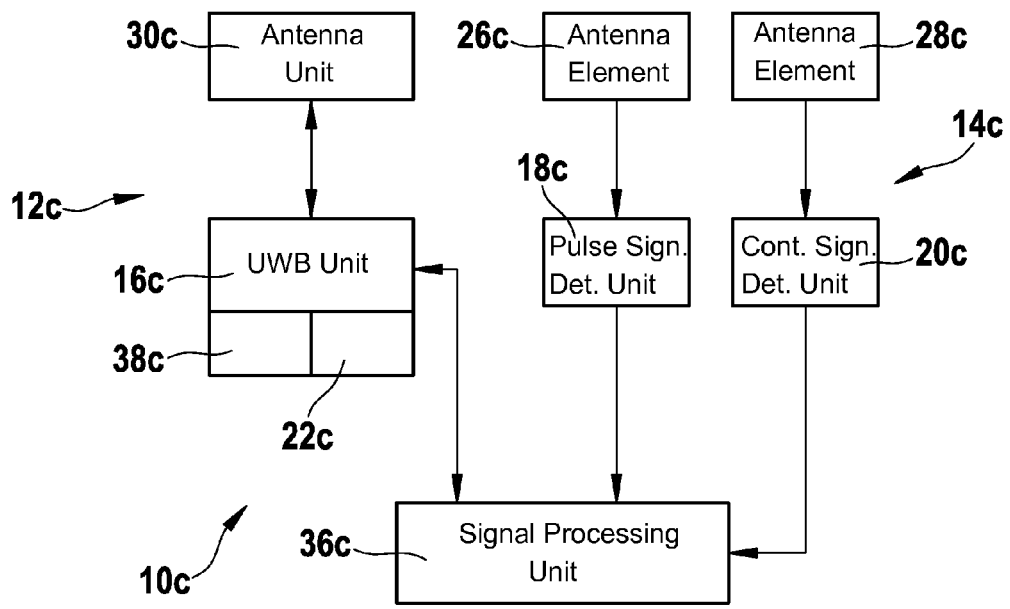
FIG. 3 is an alternative configuration of the measuring device with autonomous detectors in a schematic depiction and FIG. 4 is an alternative configuration of the measuring device having integrally configured detectors in a schematic depiction.
Figure 4:
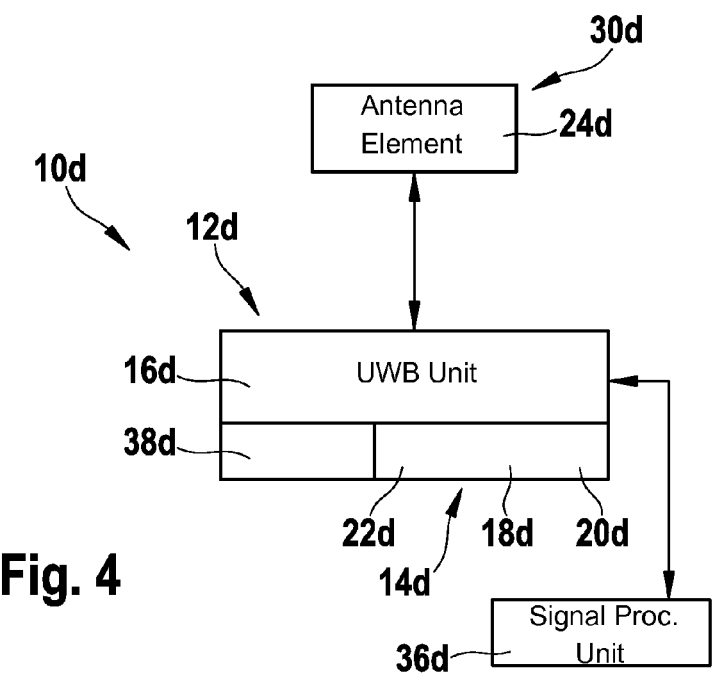

Alternative embodiments are depicted in FIGS. 2 to 4. Substantially unchanged components, characteristics and functions are basically labeled with the same reference numerals. In order to distinguish between the embodiments, the letters a to d are, however, added to the reference numerals of the embodiments. The following description limits itself substantially to the differences to the embodiment in FIG. 1. In so doing, reference is made to the description of the embodiment in FIG. 1 with regard to components, characteristics and functions that remain unchanged.

An alternative measuring device 10b is schematically depicted in FIG. 2. The measuring device 10b has a measuring unit 12b and an external signal recognition unit 14b. The external signal recognition unit 14b has a continuous signal detection unit 20b and an external signal detection unit 18b, which are configured separate from one another. A receive signal of an antenna element 24b of an antenna unit 30b is directed to a signal extraction unit 32b and split there. A first part of the receive signal is directed to the pulse signal detection unit 18b, a second part of the response signal to a switching element 34b of the signal extraction unit 32b. The receive signal is directed from the switching element 34b further to the continuous signal detection unit 20b, respectively to the measuring unit 12b. It is sufficient for recognizing an external signal if the receive signal is directed to the continuous signal recognition unit 20b by means of the switching element 32b within a cycle duration for recognizing an external signal, for example twelve seconds, in a small time window, for example several hundred milliseconds. The receive signal is directed to the measuring unit 12b, respectively to an ultra wide band unit 16b for the remainder of the cycle duration so that a weakening, respectively a damping, of a measuring signal is prevented as much as possible. A detection of continuous external signals and external pulse signals by the external signal recognition unit 14b and a measurement with the aid of the measuring unit 12b occur analogous to the description regarding FIG. 1.

An alternative measuring device 10c is schematically depicted in FIG. 3. The measuring device 10c has a measuring unit 12c and an external signal recognition unit 14c. The external signal recognition unit 14c has a pulse signal detection unit 18c and a continuous signal detection unit 20c, which are configured separate from one another. The pulse signal detection unit 18c has an antenna element 26c, which is configured separate from an antenna element 28c of the continuous signal detection unit 20c. In addition, the two antenna elements 26c, 28c are configured separate from an antenna unit 30c of the measuring unit 12c. A detection of continuous external signals and external pulse signals by the external signal recognition unit 14c and a measurement with the aid of the measuring unit 12c occur analogous to the description regarding FIG. 1. It is in principle also conceivable in a further configuration of the invention for the antenna element 26c of the pulse signal detection unit 18c and the antenna element 28c of the continuous signal detection unit 20c to be integrally configured with each other so that both external signals, respectively both external signal types, can be received by means of one antenna element 26c, 28c.

An alternative measuring device 10d is schematically depicted in FIG. 4. The measuring device 10d has a measuring unit 12d and an external signal recognition unit 14d, which are integrally configured with each other. A sensor receiver 22d of an ultra wide band unit 16d of the measuring unit 12d is thereby a continuous signal detection unit 20d and is configured as a pulse signal detection unit 18d. In so doing, the ultra wide band unit 16d, respectively the sensor receiver 22d, is adapted to detect a measuring spectrum, a continuous external signal and an external pulse signal. In an additional configuration of the invention, it is also furthermore conceivable for the sensor receiver 22d of the ultra wide band unit 16d to be integrally configured with only the continuous signal recognition unit 20d or the pulse signal recognition unit 18d. A detection of continuous external signals and external pulse signals by the external signal recognition unit 14d and a measurement with the aid of the measuring unit 12d occur analogous to the description regarding FIGS. 1 and 2.

The invention claimed is:

1. A measuring device, especially for a machine tool and/or a manual measuring device, comprising:
   a measuring unit that is adapted to perform ultra-wide band measurements;
   an external signal recognition unit, the external signal recognition unit comprising:
   at least one pulse signal detection unit adapted to detect external pulse signals, and
   at least one continuous signal detection unit adapted to detect continuous external signals, continuous external signals being signals having external pulses greater than a threshold value, the threshold value being consecutively exceeded by a plurality of the signals; and
   a signal extraction unit adapted for splitting a received signal of an antenna unit, wherein:
   the external signal recognition unit is adapted to recognize an external signal during and/or prior to a measurement of the measuring unit; and
   at least one operating mode is adapted to reduce a power output of the measuring unit.

2. The measuring device according to claim 1, wherein the measuring unit has at least one sensor receiver, which is at least partially integrally configured with the pulse signal detection unit.

3. The measuring device according to claim 1, wherein the measuring unit has at least one sensor receiver, which is at least partially integrally configured with the continuous signal detection unit.

4. The measuring device according to claim 1, wherein the external signal recognition unit has at least one antenna element, which is adapted to receive the external signal.

5. The measuring device according to claim 4, wherein the measuring unit has an antenna unit for receiving and/or transmitting a measuring signal, the antenna unit comprising at least a part of an antenna element that is adapted to receive the external signal.

6. The measuring device according to claim 1, wherein the pulse signal detection unit comprises an antenna element.

7. The measuring device according to claim 6, wherein an antenna element of the pulse signal detection unit and an antenna element of the continuous signal detection unit are at least partially integrally configured with one another.

8. The measuring device according to claim 1, wherein the continuous signal detection unit comprises an antenna element.

9. The measuring device according to claim 1, wherein the signal extraction unit comprises at least one switching element.

10. The measuring device according to claim 1, wherein a signal processing unit, which is adapted to set an operating mode of the measuring unit when an external signal of the external signal unit is present.

11. The measuring device according to claim 1, wherein at least one operating mode comprises a cut-out mode of the measuring unit.

12. The measuring device of claim 11 wherein the cut-out mode comprises performing measurements only in parts of the measuring spectrum of the measuring unit where external signals have not been detected.

13. The measuring device of claim 11 capable of performing measurements while external signals are detected, wherein the measurements are performed only in the parts of the measuring spectrum of the measuring unit where external signals have not been detected.

14. A method for performing a measurement while external signals are detected with a measuring device according to claim 11, wherein the measurement is performed only in the parts of the measuring spectrum of the measuring unit where external signals have not been detected.

15. The measuring device according to claim 1, wherein at least one operating mode is adapted to change at least one measuring frequency of the measuring unit.

16. A method for performing a measurement with a measuring device according to claim 1, wherein an external signal recognition is implemented during the measurement.

17. The method according to claim 16, wherein at least one external pulse signal is detected to recognize an external signal.

18. The method according to claim 16, wherein continuous external signals are detected to recognize an external signal.

19. The method according to claim 16, wherein an operating mode is changed for the measurement when an external signal is present.

* * * * *